(12) United States Patent
Naumann

(10) Patent No.: US 7,646,735 B1
(45) Date of Patent: Jan. 12, 2010

(54) METHOD AND APPARATUS FOR COMMUNICATION OF MISSING LOGIC IN A PCI BASED SYSTEM BY ENABLING OR DISABLING PCI CONFIG CYCLES

(75) Inventor: Joel Naumann, Morgan Hill, CA (US)

(73) Assignee: Cisco Technology, Inc., San Jose, CA (US)

( * ) Notice: Subject to any disclaimer, the term of this patent is extended or adjusted under 35 U.S.C. 154(b) by 1356 days.

(21) Appl. No.: 09/612,067

(22) Filed: Jul. 7, 2000

(51) Int. Cl.
*H04L 12/28* (2006.01)
*H04L 12/50* (2006.01)
*H04L 12/66* (2006.01)

(52) U.S. Cl. .................... 370/257; 370/362; 370/463

(58) Field of Classification Search ............. 370/254, 370/257, 469, 395.1, 463, 362, 445, 450
See application file for complete search history.

(56) References Cited

U.S. PATENT DOCUMENTS

| | | | | |
|---|---|---|---|---|
| 5,489,896 A | * | 2/1996 | Sofer et al. | 370/445 |
| 5,720,032 A | * | 2/1998 | Picazo et al. | 709/250 |
| 5,878,044 A | * | 3/1999 | Frischknecht et al. | 370/466 |
| 5,923,663 A | * | 7/1999 | Bontemps et al. | 370/445 |
| 5,930,496 A | * | 7/1999 | MacLaren et al. | 703/23 |
| 5,953,318 A | * | 9/1999 | Nattkemper et al. | 370/236 |
| 6,385,669 B1 | * | 5/2002 | Creedon et al. | 710/19 |
| 6,408,347 B1 | * | 6/2002 | Smith et al. | 710/36 |
| 6,549,960 B1 | * | 4/2003 | Allison et al. | 710/29 |
| 6,636,904 B2 | * | 10/2003 | Fry et al. | 710/8 |
| 6,694,394 B1 | * | 2/2004 | Bachrach | 710/100 |
| 7,280,591 B2 | * | 10/2007 | Sung | 375/220 |
| 2007/0104124 A1 | * | 5/2007 | Lee et al. | 370/311 |
| 2009/0097392 A1 | * | 4/2009 | Diab et al. | 370/201 |

OTHER PUBLICATIONS

Homann; "Dual Speed End Station and System"; Jul. 26, 2001; United States Patent Application Publication.*

* cited by examiner

*Primary Examiner*—Tri H Phan
(74) *Attorney, Agent, or Firm*—Patterson & Sheridan, LLP

(57) ABSTRACT

A method and apparatus for the detection and communication of a missing LAN or WAN compliant device is disclosed. The method and apparatus provide a front card configured to accept a Fast Ethernet device on a PCI-compliant bus, and the front card includes a switch which is serially disposed on a PCI_Idsel line corresponding to a particular channel of the front card. The switch is further configured to receive a sensing signal corresponding to the channel from the device. The apparatus is configured to provide the PCI_Idsel line to the front card if the sensing signal is in a first state, and to provide a low potential to the front card if the sensing signal is in a second state.

18 Claims, 7 Drawing Sheets

Present Invention

Present Invention

Present Invention

Present Invention

Present Invention

Present Invention

METHOD AND APPARATUS FOR COMMUNICATION OF MISSING LOGIC IN A PCI BASED SYSTEM BY ENABLING OR DISABLING PCI CONFIG CYCLES

BACKGROUND OF THE INVENTION

1. Field of the Invention

The present invention relates to data communications. In particular, the present invention relates to routers and the detection and communication of missing Phy Level logic to a host processor.

2. The Prior Art

Background

The Personal Computer Interface (PCI) bus standard has found widespread use in today's data communications system, primarily because of the advantages found in the PCI standard. For example, one advantage of the PCI design is that up to 256 devices can be attached to one PCI local bus, and up to 256 PCI busses can exist in one system. Furthermore, PCI is a Plug and Play architecture—it is auto-configured by system BIOS. This means that system resource assignments destined for expansion devices (such as IRQ assignments and address space) is all automated, there is a greatly reduced chance of resource allocation conflicts. These features of the PCI bus make it one of the most suitable architectures available to the PC industry today.

As is known by those skilled in the art, the basic components of the PCI bus include: the PCI BIOS, a CPU, a CPU Cache, System Cache, System Memory, a PCI Bridge, and a Peripheral bus. Each component performs a specific task associated with accomplishing communication via the PCI bus. Thus, each component has a specific method that it uses to interact with adjacent components. Because these methods of component interaction are the same in all PCI systems, the PCI design is inherently adaptable to a variety of configurations. It is standard to include embedded devices and peripheral devices on the same bus for this reason.

One application where a PCI system must adapt for a variety of configurations is within a router. FIG. 1 shows a prior art diagram of a router having a PCI-compliant bus deployed therein.

FIG. 1 includes a router motherboard 100, known as a front card. Front card 100 has hardware and software standard in the art. FIG. 1 also includes a daughterboard 101, known as a back card. Back card 101 represents a Fast Ethernet-compliant (FE) device coupled to front card 100. Back card 101 includes a FE Media Access Controller (MAC) 110 configured to perform OSI-standard Layer 2 functions. Back card 101 also includes a FE Physical (Phy) controller 112 configured to perform OSI-standard Layer 1 functions. FE Phy 112 is coupled to FE MAC 110 via a MII (Media Independent Interface) interface 114 standard in the art.

Back card 101 also includes an identification programmable read-only memory (ID PROM) 104 configured to provide information about the back card 101 to the front card 100 via a serial bus 102 standard in the art.

As can be seen by inspection of FIG. 1, in order to couple back card 101 to the front card 100, the FE MAC 110 must be coupled to the front card 100 via a 32-bit wide PCI address data bus (PCI_AD) 108. Additionally, the PCI identification select connection (PCI_Idsel) 106, with resistor 105 serially disposed therein, and serial bus 102 must also be coupled. Thus, a suitable physical connector capable of making this plethora of connections must be provided.

As will be appreciated by those skilled in the art, such a connector is rather large when compared to the size of the components being connected, especially given the ever-decreasing size of semiconductor devices. Because circuit board real estate is so valuable, the prior art searched for ways to eliminate the area penalty imposed by a connector which must make so many connections.

FIG. 2 shows one solution proposed by the prior art. Similar designations are intended to designate substantially similar matter herein throughout. As can be seen by inspection of FIG. 2, the solution proposed was to locate the FE MAC 110 on the front card 100, thus eliminating the need to physically couple the PCI_AD bus 108 through a physical connector and re-gaining the area savings by eliminating the need for a large connector.

However, the prior art solution of FIG. 2 posed certain problems.

By way of background, when a PCI-compliant device is coupled to a host device, certain procedures occur to ensure a proper connection. An important aspect of the PCI standard is the identification of devices which have made themselves available to the bus. When a device is present, it makes its presence known by responding to the host when its ISDEL input is driven high during a config cycle. During the config cycle, a device is targeted by a combination of Command/byte enable signals (C/BE[3:1]=101) during the PCI address phase, and by making active the devices' IDSEL input. All devices on the PCI bus will look at their IDSEL inputs and will respond if the IDSEL input is active. Typically the IDSEL pins are driven by one of the Address bus bits AD[31:11] which is typically resistively coupled using a 50K Ohm resistor 105. Each device gets its own Address bit.

For example:

PCI_AD[11]->FE MAC #1 IDSEL input

PCI_AD[12]->FE MAC #2 IDSEL input

As can be seen by inspection of FIG. 1, this procedure worked fine (i.e. host software could easily identify a missing Fast Ethernet interface) when the FE MAC 110 was located on the back card 101. However, when the FE MAC 110 was moved to the front card 100, the FE MAC 110 was now permanently coupled to the front card 100 through the connection of the PCI AD signal to the FE MAC's IDSEL 106. Thus, the FE MAC IDSEL connection will always be driven when the host checks for devices, creating the risk that the FE MAC may mistakenly believe that a device is connected when in fact there is no FE Phy present.

To compensate, the prior art developed software to detect whether an FE Phy was present. One example of such software utilized the ID PROM to determine whether a FE Phy was present. In this example, the ID PROM was programmed to communicate whether there was a FE Phy installed on a given channel.

However, such solutions have certain disadvantages. If the ID PROM is not programmed correctly or malfunctions, the front card 100 may mistakenly sense that a back card device is connected when in fact no FE Phy is present In this case, the PCI scan of the FE MAC device would identify the interface as being present.

Furthermore, such software adds processing overhead and may be prone to errors, thereby decreasing the overall efficiency of the host device.

Hence there is a need for a method and apparatus to identify when a FE Phy is present in a PCI-compliant system which does not suffer from the disadvantages of the prior art.

BRIEF DESCRIPTION OF THE INVENTION

The invention satisfies the above needs. The present invention relates to data communications. In particular, the present invention relates to routers, and or switches and the detection and communication of a PHY Level logic to a host processor.

A method and apparatus for the detection and communication of a missing component of a Fast Ethernet interface to a host device is disclosed. The present invention solves the problems of the prior art without the need for additional software or programming.

A first aspect of the present invention includes a front card configured to accept a Fast Ethernet device on a PCI-compliant bus, and the front card includes a switch which is serially disposed on a PCI_AD to device IDSEL connection corresponding to a particular channel on said front card. The switch is further configured to receive a sensing signal corresponding to said channel from said device. The apparatus is configured, to enable the connection of PCI_AD to FE MAC device IDSEL on the front card if the sensing signal is in a first state, and provide a low potential to the device's IDSEL input on the front card if said sensing signal is in a second state.

A second aspect of the present invention comprises switching means disposed on the front card; said switching means being configured to receive a sensing signal from the back card. The sensing signal has a first and second state, and the switching means is configured to provide a predetermined signal to the front card depending on the state of the sensing signal.

A third aspect of the present invention is a method comprising receiving, by the front card, a sensing signal from the back card; if the sensing signal is a logical low, then providing a PCI_AD to device IDSEL connection corresponding to a particular channel of said back card to the front card; and if the sensing signal is not low, then decoupling the PCI_AD to device IDSEL connection and providing a logical low signal in the place of the PCI_AD line.

BRIEF DESCRIPTION OF THE DRAWING FIGURES

Figure 6A:
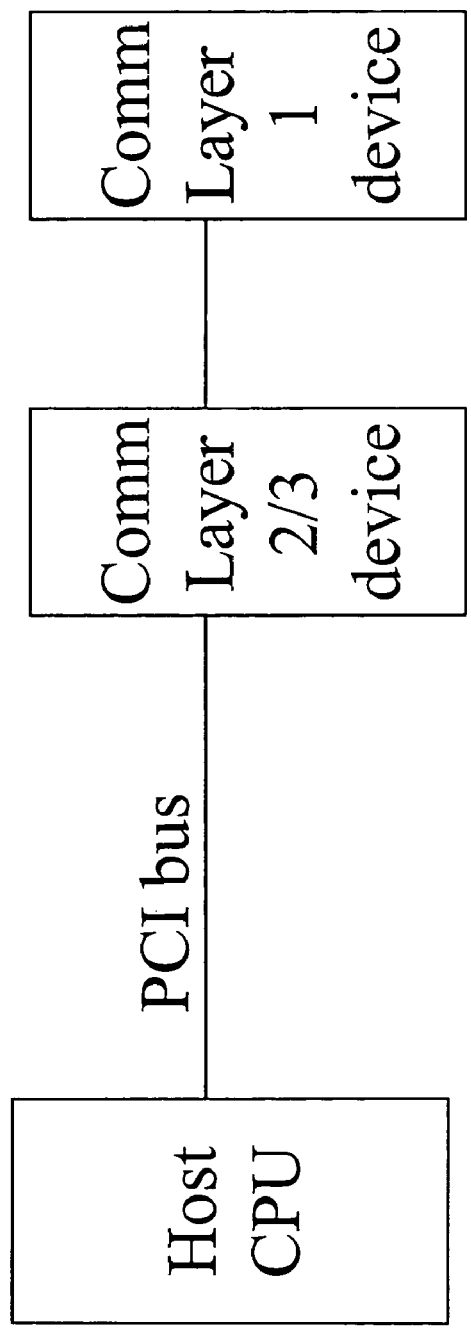

FIG. 6A a is block diagram of a system having a single L1 device coupled to a L2/L3 device incorporating the present invention.

Figure 6B:
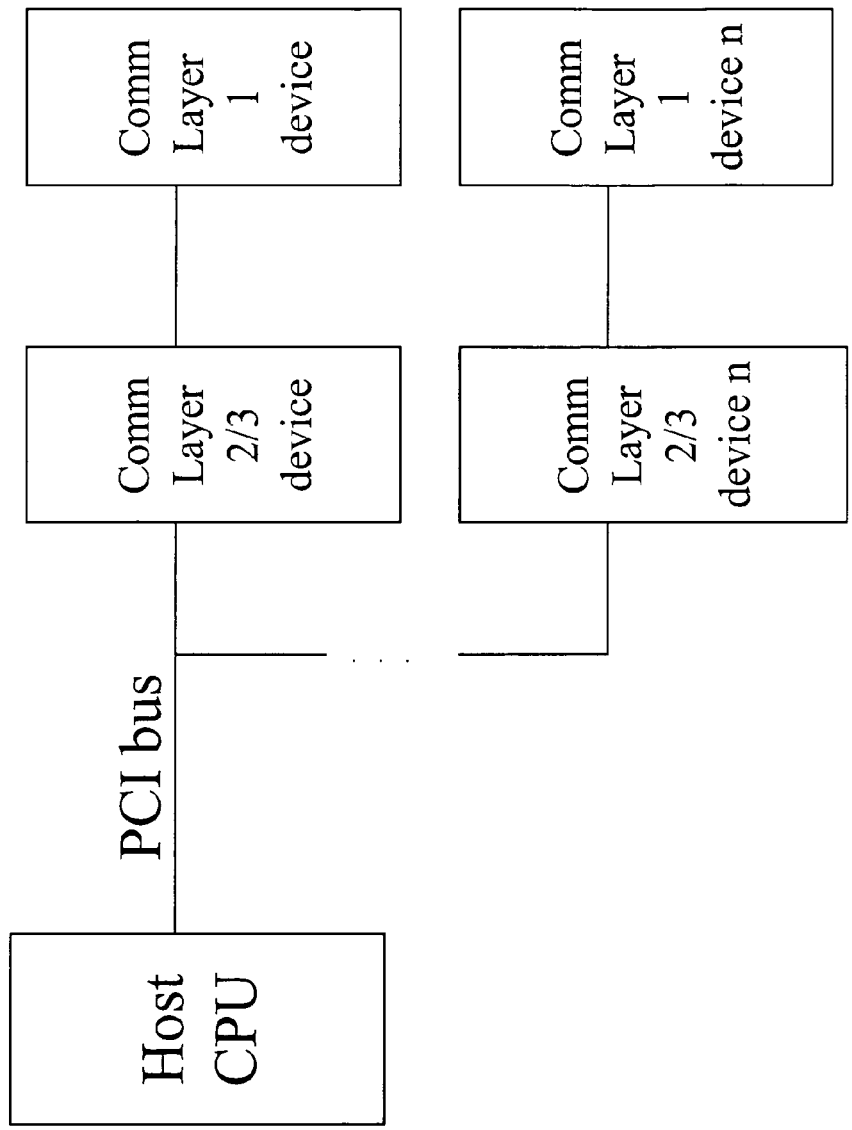

FIG. 6B is a block diagram showing a plurality of L1 devices connected to a plurality of L2/L3 devices incorporating the present invention.

DETAILED DESCRIPTION OF PREFERRED EMBODIMENTS

Persons of ordinary skill in the art will realize that the following description of the present invention is illustrative only and not in any way limiting. Other embodiments of the invention will readily suggest themselves to such skilled persons having the benefit of this disclosure.

The present invention may be described through the use of flowcharts. Often, a single instance of an embodiment of the present invention will be shown. As is appreciated by those of ordinary skill in the art, however, the protocols, processes, and procedures described herein may be repeated continuously or as often as necessary to satisfy the needs described herein. Accordingly, the representation of the present invention through the use of flowcharts should not be used to limit the scope of the present invention.

The present invention provides a method and apparatus for the detection and communication of a missing LAN or WAN compliant device, such as a Fast Ethernet device to a host device. The present invention overcomes the problems of the prior art by providing circuitry which disables the connection of PCI_AD to device IDSEL pin when a FE Phy device is not present.

Two aspects of the present invention will now be disclosed, a first aspect includes the situation when a FE Phy is present on a particular backcard, and the second aspect includes the situation when a FE Phy is not present on a particular backcard. A method according to the present invention is also presented.

Figure 3:
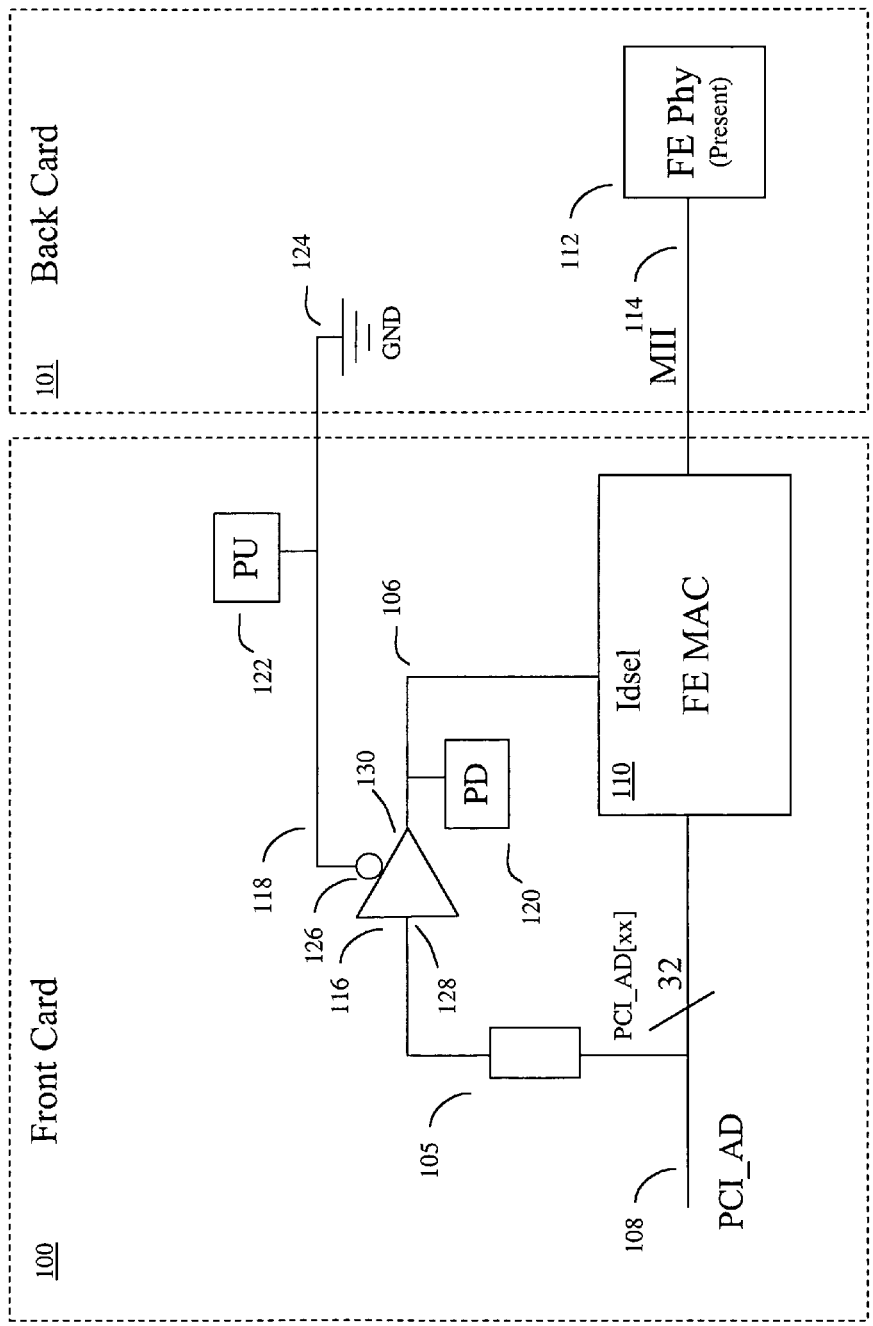
FIG. 3 is a schematic diagram of an apparatus according to the present invention.

FIG. 3 is schematic of a first aspect of a detection device according to the present invention. Similar designations are intended to indicate substantially similar matter herein.

Figure 1:
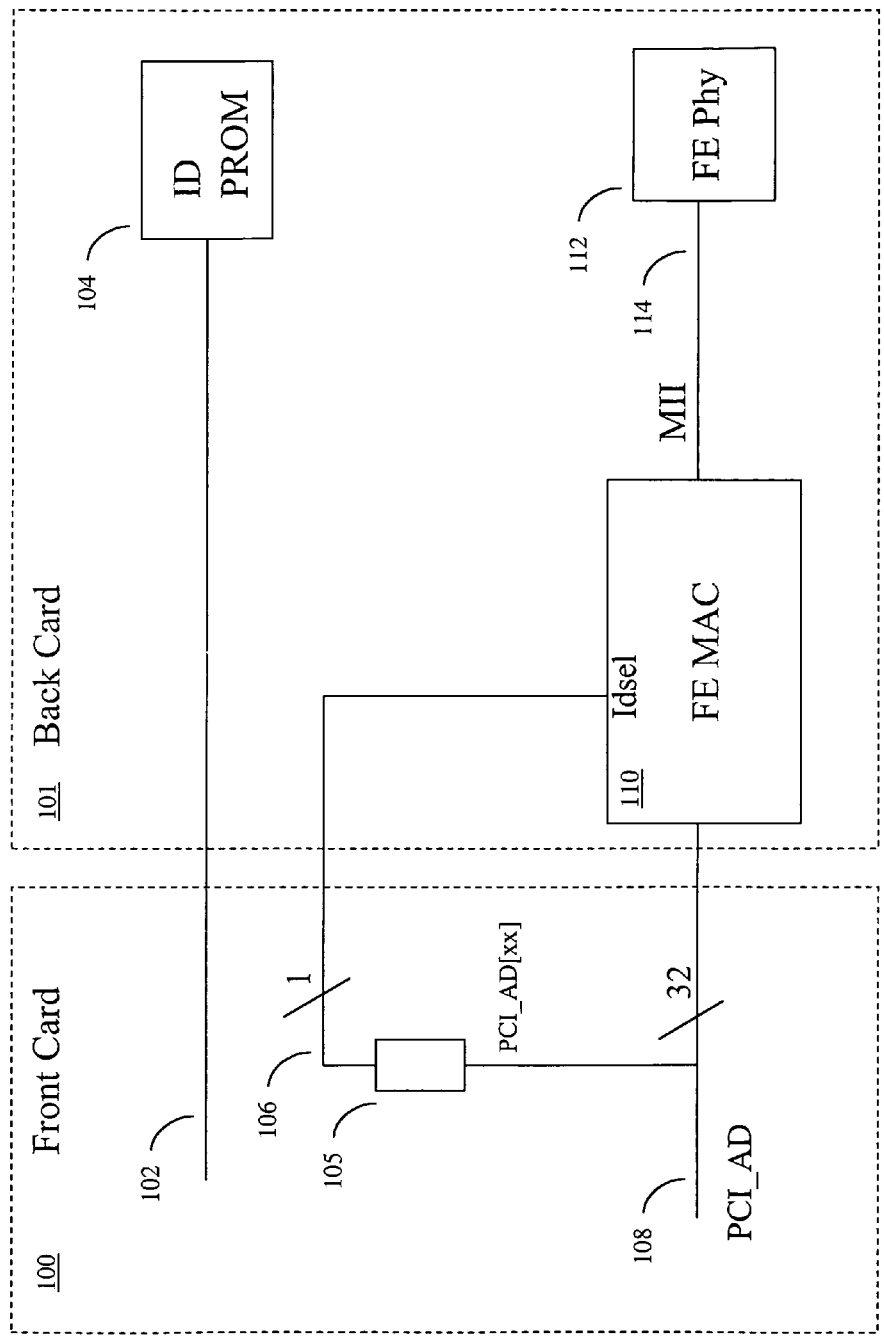
FIG. 1 is a prior art diagram of a PCI-complaint communications system.
Figure 2:
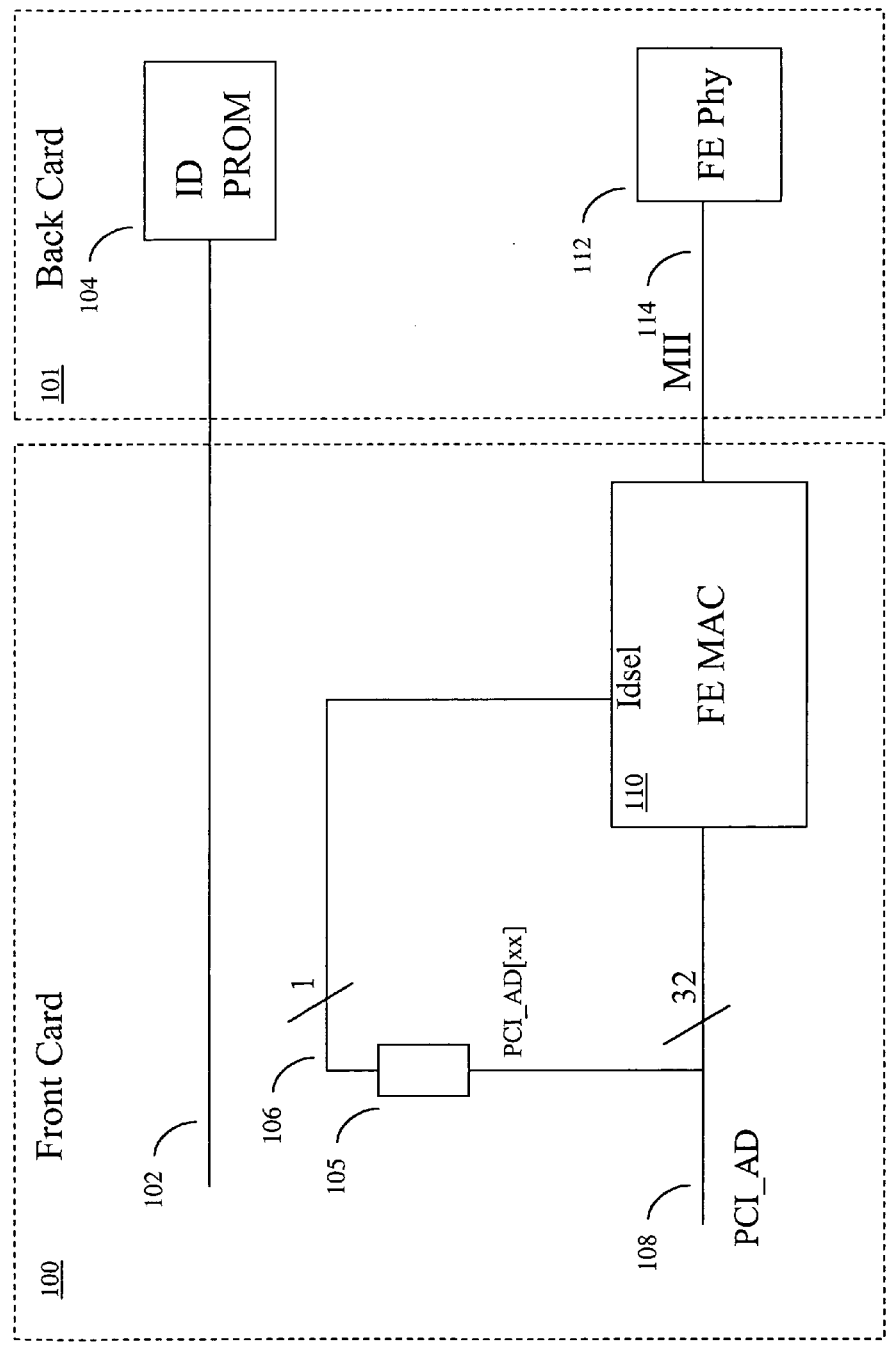
FIG. 2 is a further prior art diagram of a PCI-complaint communications system.

FIG. 3 includes a router front card 100 having hardware and software standard in the art as disclosed in FIGS. 1 and 2. FIG. 3 also includes a back card 101 which represents a Fast Ethernet-compliant physical layer device (FE) device to coupled to front card 100. Front card 100 includes a FE MAC 110 configured to perform OSI-standard Layer 2 functions. Back card 101 includes a FE Phy controller 112 configured to perform OSI-standard Layer 1 (phy layer) functions. FE Phy 112 may be coupled to FE MAC 110 via a MII interface 114 standard in the art. Backcard 101 may also include an ID PROM (not shown) as in FIGS. 1 and 2.

Back card 101 also includes an identification programmable read-only memory (ID PROM) 104 configured to provide information about the back card 101 to the front card 100 via a serial bus 102 standard in the art.

FIG. 3 includes a switch 116 serially coupled with IDSEL 106. Switch 116 has an input 128, an output 130, and a switching input 126. It is contemplated that switch 116 may be fabricated from any electrical circuit standard in the art, such as transistor or logic circuitry. In an exemplary non-limiting embodiment, switch 116 comprises a tri-stateable buffer standard in the art.

FIG. 3 also includes a pull-down (PD) device 120. PD device 120 is coupled to the output 130 of switch 116. PD device 120 may comprise electrical means standard in the art for placing the IDSEL connection 106 at a ground potential. In an exemplary non-limiting embodiment, PD device 120 comprises a resistor having a value of approximately roughly 5K Ohms.

FIG. 3 also includes a switching line 118 coupled to the switching input 126 of switch 116. FIG. 3 further includes pull-up (PU) device 122. PU device 122 may comprise electrical means standard in the art for placing the switching line 118 at a high potential. In an exemplary non-limiting embodiment, PU device 122 comprises a resistor having a value of approximately roughly 5K Ohms.

Switching line 118 is also configured to be coupled to back card 101 through a connector standard in the art. On back card 101, switching line 118 is terminated at a sensing point 124.

In an exemplary non-limiting embodiment, sensing point 124 is configured to electrically float if there is no FE Phy present, and to be coupled to a low potential or ground if there is a FE Phy present.

It is contemplated that the coupling is done at the factory during assembly through the loading of a 0 Ohm resistor. If the FE Phy is not loaded on a particular backcard, then the associated 0 Ohm resistor is also not loaded. It is also contemplated that this 0 ohm resistor may comprise a jumper which can be installed or removed just before shipping the product. Utilizing a jumper has the advantage whereby a manufacturing operation utilizing the present invention can produce only a single assembly and customize it later by activating the proper number of ports purchased by a customer.

The operation of the circuitry disclosed in FIG. 3 will now be described. FIG. 3 illustrates the case where the FE Phy 112 is present. Thus, it is desired that this be communicated to the FE MAC.

When a FE Phy is present, sensing point 124 will be brought to a low or ground potential. When sensing point 124 is brought low, switch 116 will be opened by virtue of the low being applied to inverting switch input 126. Thus, from the perspective of the front card 100, sensing point 124 on the back card 101 provides a sensing signal to the front card 100 which indicates whether there is a FE Phy present on the corresponding channel of the back card. It is contemplated that the sensing signal being low may represent a first state, and when the sensing signal is not low, the sensing signal is in a second state.

It should be noted that PU device 122 and PD device 120 are configured to operated as "weak" buffers, and switch 116 is configured to operate as a "strong" buffer. As is known by those of ordinary skill in the art, the operational state of switch 116 will then control the operation of the present invention. Thus, when sensing point 124 is brought low, switch 116 will be opened in spite of the presence of PU device 122.

Therefore, when a FE Phy is present, the switch 116 is opened, the IDSEL connection 106 is coupled to the FE MAC 110, and the back card will be coupled to the front card via the bus per normal PCI procedures.

Figure 4:
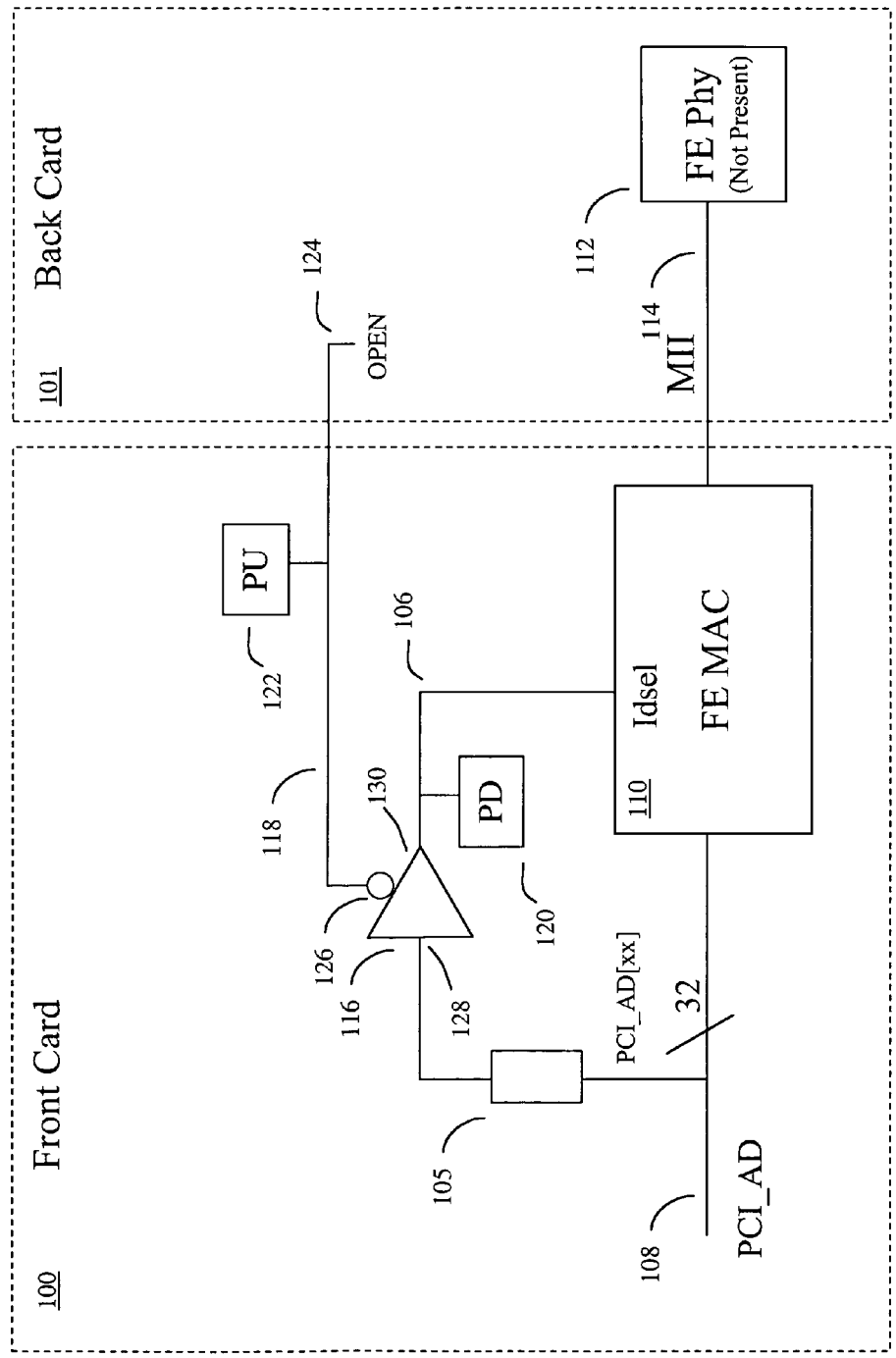
FIG. 4 is a schematic diagram of an apparatus according to the present invention.

Referring now to FIG. 4, a schematic of a second aspect of a detection device according to the present invention is shown. FIG. 4 illustrates an example where the FE Phy is not present. FIG. 4 includes structure substantially similar to FIG. 3.

When the FE Phy 112 is not present, sensing point 124 is configured to electrically float. As is appreciated by those of ordinary skill in the art, sensing point 124 may also have a high potential, but floating the signal is beneficial since back-card power is not required to identify the missing component. When sensing point 124 is floating, the PU device 122 will control, and thus apply a high potential to switching input 126 of switch 116, thus closing the switch 116. When the switch 116 is closed, the IDSEL connection 106 is decoupled from the FE MAC 110.

When switch 116 is closed, the PD device 120 will control, and apply a low potential to FE MAC 110. As will be appreciated by those of ordinary skill in the art, when the FE MAC 110 senses a low on the IDSEL connection 106, it will determine that there is no FE Phy present on that particular channel. Thus, FE MAC 110 will not expect there to be a FE Phy present on MII interface line 114. Thus, the result of the operation shown in FIG. 4 is that the IDSEL connection for a particular channel will be decoupled, and a low potential provided to the FE MAC in its place.

Thus, the structure disclosed in FIGS. 3 and 4 provides an excellent example of a means for detecting and communicating the absence of the Physical layer device in a communication system to a host device.

Figure 5:
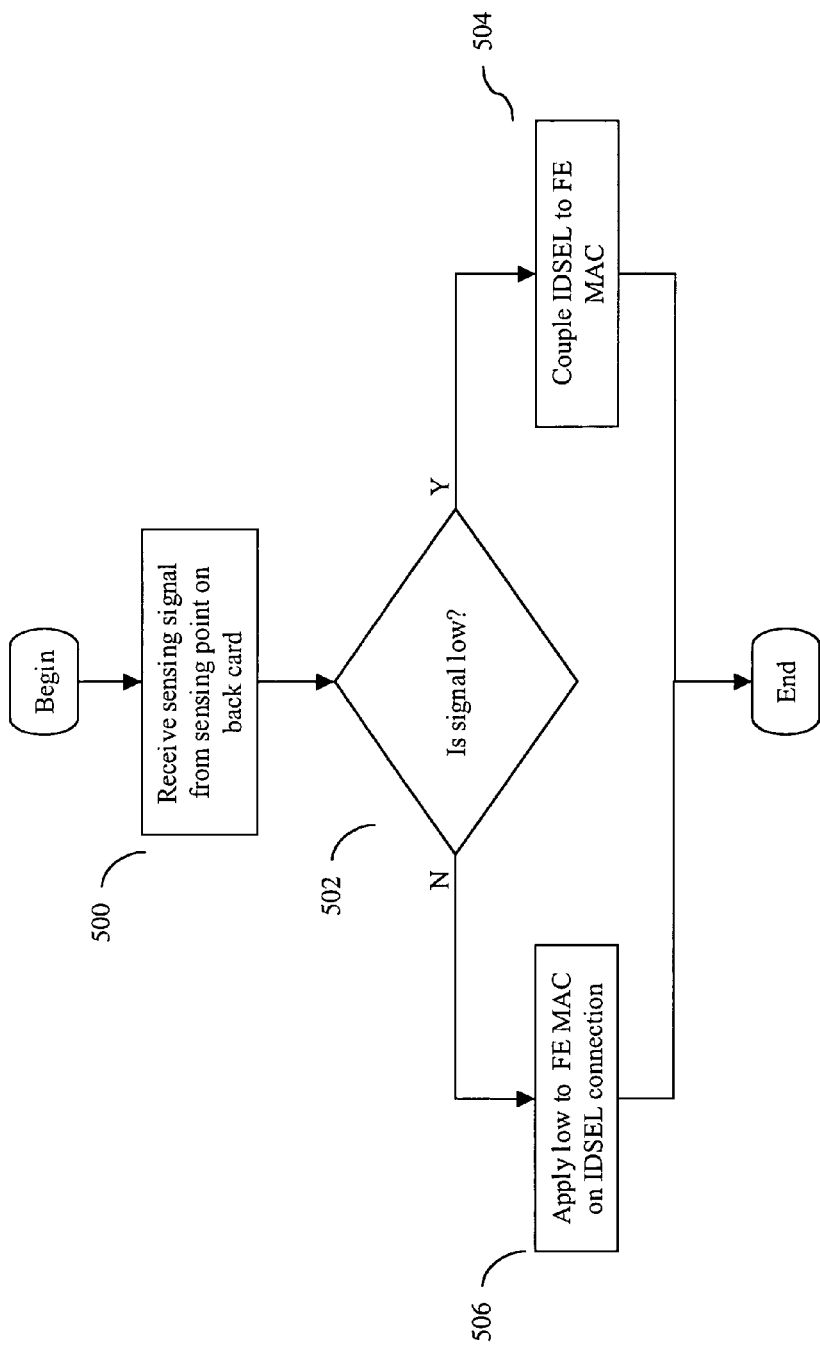
FIG. 5 is a flowchart of a method according to the present invention.

FIG. 5 is a flowchart of a method for detecting and communication of a missing FE device to a host device. The process of FIG. 5 begins in act 500 with the host device receiving a sensing signal from a back card which is coupled to a PCI-compliant bus.

In query 502, the path of the process depends on whether the sensing signal is a logical high or low. If the sensing signal is high, the IDSEL connection will be coupled to the FE MAC of the host device in act 504. If the signal is low, then the corresponding IDSEL connection will be decoupled from the FE MAC, and its place, a logical low or ground potential will be coupled to the corresponding IDSEL connection of the FE MAC in act 506. The process of FIG. 5 then ends.

While the descriptions above have focused on the application of an FE Phy and FE MAC there are other individual devices for Layer 1 and Layer 2/3 functions that will benefit from the present invention. Other examples are shown in Table 1:

TABLE 1

| L2/3 | via | L1 |
|---|---|---|
| FE MAC | MII | Fe Phy |
| HDLC control | TDM bus | T1/E1 framer/Line interface |
| ATM SAR | Utopia | ATM Phy |

For each of the above cases, the L2/L3 device is typically a PCI based device. However, software may or may not be able to identify whether or not the Layer 1 device is present in a system, and hence the need for the present invention arises. Thus, the present invention may also be utilized with any LAN or WAN complaint system.

Further embodiments may be readily apparent to one having the benefit of this disclosure. For example, the present invention has been described in the context of an environment where there is a single L1 device coupled to a L2/L3 device, as shown in FIG. 6A.

However, the present invention may be employed in environments where a plurality of L1 devices are coupled to a plurality L2/L3 devices, as shown in FIG. 6B. For example, a router back card may be designed to have eight channels, but the customer only wishes to purchase a four channel system, or the vendor wishes to limit the number of channels available by loading components. Using the structure and methods of the present invention, the back card may be configured the have the sensing lines of the active channels floating, and the sensing lines of the de-active channels brought to a low potential. When the back card is coupled to a front card enabled with the present invention, the front card will automatically sense which channels are active and which channel are de-active, and communicate this information to the FE MAC on the front card, and the front card will couple the back card to the bus appropriately. In an exemplary non-limiting embodiment of the present invention, Phy to Mac device mapping is 1 to 1.

Though the above description has been illustrated in the environment of a router, it is contemplated that the present invention may be employed where ever it is desired to determine whether there is a L1 device present in a PCI-compliant system. Appropriate modifications may be made to the structure and methods disclosed herein to adapt the present invention to the desired environment without departing from the spirit if the present invention.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A method comprising:
receiving, by a switching input of a tri-state buffer provided on a PCI-compliant (Personal Computer Interface) front card comprising an FE MAC (fast Ethernet media access controller) in a router, a sensing signal from a back card comprising an FE Phy (physical layer) in the router, where the tri-state buffer is serially disposed on a IDSEL (identification select) line corresponding to a particular channel, where the tri-state buffer is connected to both a pull up component located on the front card and a pull down component located on the front card;
if the sensing signal is a logical low, then coupling a IDSEL signal corresponding to a particular channel of the back card to the front card; and
if the sensing signal is not low, then decoupling the IDSEL signal from the front card and providing a logical low signal in the place of the IDSEL signal.

2. The method of claim 1, where the front card and the back card are coupled via an MII (Media Independent Interface) bus.

3. The method of claim 1, where the front card comprises an HDLC (high level data link controller) control, and the back card comprises a T1/E1 frame/line interface.

4. The method of claim 3, where the front and the back card are coupled via a TDM (time division multiplexing) bus.

5. The method of claim 1, where the front card comprises an ATM (asynchronous transfer mode) SAR (software segmentation and reassembly), and the back card comprises an ATM Phy.

6. The method of claim 5, where the front card and the back card are coupled via a Utopia bus.

7. In a communications system having a router, the router having a PCI-compliant (Personal Computer Interface) front card, the front card being configured to accept a LAN (local area network) or WAN (wide area network) compliant back card, an apparatus for detecting the absence of a Phy (physical) Layer device on the back card and communicating the absence to the front card, the apparatus comprising:
means for switching disposed on the front card comprising, a tri-state buffer where the tri-state buffer has an input, an output, and a switching input, where the input and the output of the tri-state buffer being serially disposed on the front card, and the switching input of the tri-state buffer is configured to be coupled to the back card, where the front card comprises an FE MAC (fast Ethernet media access controller), and the back card comprises an FE Phy (fast Ethernet physical layer), the tri-state buffer being connected to both a pull up component located on the front card and to a pull down component located on the front card;
the means for switching being configured to receive a sensing signal from the back card, the sensing signal having a first and second state;
the means for switching being configured to provide a predetermined signal to the front card responsive to the state of the sensing signal.

8. The apparatus of claim 7, where the front card and the back card are coupled via an MII (media independent interface) bus.

9. The apparatus of claim 7, where front card comprises an HDLC (high level data link controller) control, and the back card comprises a T1/E1 frame/line interface.

10. The apparatus of claim 9, where the front card and the back card are coupled via a TDM (time division multiplexing) bus.

11. The apparatus of claim 7, where the front card comprises an ATM SAR (asynchronous transfer mode software segmentation and reassembly), and the back card comprises an ATM Phy (asynchronous transfer mode physical layer).

12. The apparatus of claim 11, where the front card and the back card are coupled via a Utopia bus.

13. An apparatus for detecting the absence of a LAN (local area network) or WAN (wide area network) compliant device, the apparatus comprising:
a PCI-compliant (personal computer interface) front card, the front card being configured to accept a LAN or WAN compliant back card, where the front card comprises an FE MAC (fast Ethernet media access controller), and the back card comprises an FE Phy (fast Ethernet physical layer);
the front card comprising a switch, the switch being a tri-state-buffer serially disposed on a IDSEL (identification select) connection corresponding to a particular channel on the front card, the switch being configured to receive a sensing signal corresponding to the channel from the device by switching input of the tri-state buffer; and
where the apparatus is configured to couple the IDSEL connection to the front card if the sensing signal is in a first state, and to provide a low potential to the front card if the sensing signal is in a second state, the switch being connected to both a pull up component located on the front card and to a pull down component located on the front card.

14. The apparatus of claim 13, where the front card and the back card are coupled via an MII (media independent interface) bus.

15. The apparatus of claim 14, where the front card comprises an HDLC (high level data link controller) control, and the back card comprises a T1/E1 frame/line interface.

16. The apparatus of claim 14, where the front card comprises an ATM SAR (asynchronous transfer mode software segmentation and reassembly) and the back card comprises an ATM Phy (asynchronous transfer mode physical layer).

17. The apparatus of claim 13, where the front card and the back card are coupled via a TDM (time division multiplexing) bus.

18. The apparatus of claim 13, where the front card and the back card are coupled via a Utopia bus.

* * * * *

UNITED STATES PATENT AND TRADEMARK OFFICE
CERTIFICATE OF CORRECTION

| | | |
|---|---|---|
| PATENT NO. | : 7,646,735 B1 | Page 1 of 1 |
| APPLICATION NO. | : 09/612067 | |
| DATED | : January 12, 2010 | |
| INVENTOR(S) | : Joel Naumann | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1938 days.

Signed and Sealed this

Twenty-eighth Day of December, 2010

David J. Kappos
*Director of the United States Patent and Trademark Office*